L. SCHWITZER.
UNIVERSAL JOINT.
APPLICATION FILED MAR. 22, 1909.

956,191.

Patented Apr. 26, 1910.

WITNESSES:
Arthur Berger
O. M. McLaughlin

INVENTOR.
Louis Schwitzer
BY
V. H. Rockwood
ATTORNEY.

UNITED STATES PATENT OFFICE.

LOUIS SCHWITZER, OF INDIANAPOLIS, INDIANA.

UNIVERSAL JOINT.

956,191.  Specification of Letters Patent.  Patented Apr. 26, 1910.

Application filed March 22, 1909. Serial No. 484,857.

*To all whom it may concern:*

Be it known that I, LOUIS SCHWITZER, of Indianapolis, county of Marion, and State of Indiana, have invented a certain new and useful Universal Joint; and I do hereby declare that the following is a full, clear, and exact description thereof, reference being had to the accompanying drawings, in which like numerals refer to like parts.

The object of this invention is to provide a strong universal joint suitable in power transmitting shafting or like mechanism, and capable of enduring considerable torsional strain, and which is also simple in construction and easily manipulated.

The chief feature of the invention consists in providing the ends of the joining members with a pair of similarly formed oppositely located projections that when interlocked are so large as to nearly meet each other, leaving a space between them in which plugs are inserted that are held fixed with reference to one projection and are slidable with reference to the adjacent projection, and suitable means are provided for spacing said projections and plugs apart and also for binding the parts together.

The nature of the invention will be understood from the accompanying drawings and the following description and claims.

Figure 1:
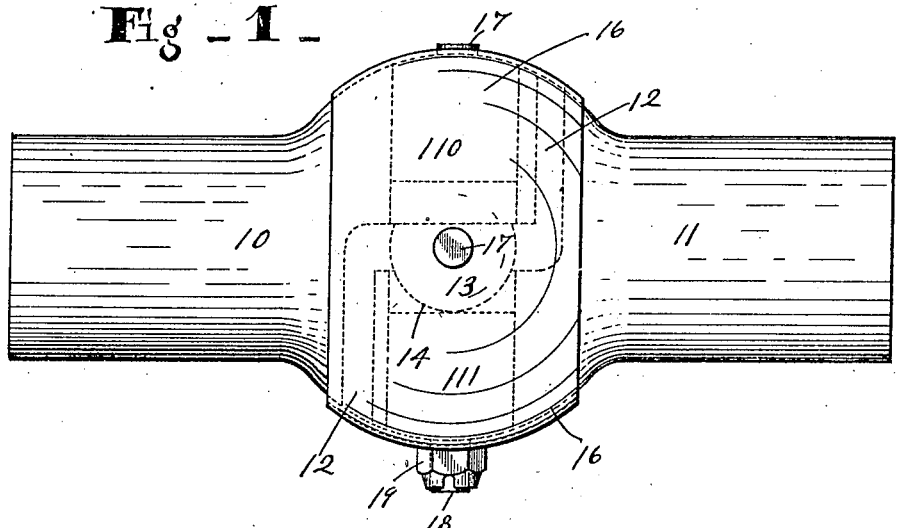
Figure 2:
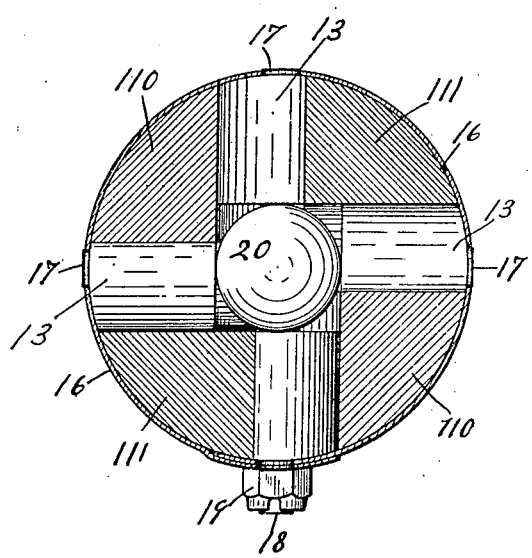

In the drawings Figure 1 is a plan view of one type of said universal joint, the outline of the parts within the band being indicated by dotted lines. Fig. 2 is a central transverse section through the same.

In the type of joint shown in Figs. 1 and 2, the end of each member 10 and 11 has two oppositely located projections, the projections from the member 10 being marked 110 and those from the member 11 being marked 111. These projections are adapted to, in a sense, interlock each other as indicated in Figs. 1 and 2, but so there will be considerable space between them, as indicated at 12 in Fig. 1 to permit flexibility of the joint and the insertion of the plugs 13. These plugs 13 are cylindrical in form, excepting that on one side they have a flat face. The flat face of the plugs fits against the corresponding flat face of one of the projections, and the curved surface of the plugs fits in a similarly curved recess 14 in the adjacent projection. This latter feature holds the plugs from longitudinal movement, that is, the plug 13, shown in Fig. 1, fits in the recess 14 of the projection 111, and has no longitudinal movement with reference to said projection, but it does have a sliding movement with reference to the adjacent projection 110. These plugs likewise space the projections apart as indicated.

The projections 110 and 111 are all similarly formed, each having an external spherically disposed surface, so that when they are fitted together they will make a spherically disposed contour for the joint over which the band 16 is secured and which when in place prevents the joint from being separated. This band is split transversely and provided with overlapping ends so it can be put in place, and is held in position by lugs 17 from the plugs, said lugs projecting through corresponding holes in the band, and by a longer lug 18 that projects through overlapping ends of the band and is threaded for a nut 19.

The projections 110 and 111 have flat side surfaces to one side and parallel with the diametric line in the joint, excepting the recesses 14 for the plugs 13. The ends on the projections are also flat and to one side of and parallel with the diametric line through the joint and are held spaced apart sufficiently from the adjacent surfaces of the members 10 and 11 by a ball 20 centrally located in the joint. This ball also spaces and holds apart, when in place, the plugs 13.

From the foregoing it is obvious that the joint is flexible in all directions as the flat surfaces of the plugs can slide upon the flat surfaces of the projections within the limits permitted by the spacing 12 and that the strength of the joint for use particularly in a rotary shaft construction is very great because of the relatively large dimensions and strength of the projections 110 and 111.

What I claim as my invention and desire to secure by Letters Patent is:

1. A universal joint including two members with a pair of oppositely located projections extending from the end of each and so that the projections on the two members may interlock each of said projections having one side surface flat and the other side surface recessed, plugs fitting between the adjacent surfaces of said projections and in the recess thereof and with a flattened surface bearing against the flattened surface of the projections so as to be slidable thereon, the external surfaces of said projections being spherically disposed, a spherically disposed band transversely surrounding the joint, and means for securing said band to said plugs.

2. A universal joint including two members with a pair of oppositely located projections extending from the end of each and so that the projections on the two members may interlock each of said projections having one side surface flat and the other side surface recessed, plugs fitting between the adjacent surfaces of said projections and in the recess thereof and with a flattened surface bearing against the flattened surface of the projections so as to be slidable thereon, the external surfaces of said projections being spherically disposed, a spherically disposed band transversely surrounding the joint, said band having holes through it, and lugs extending from the plugs through said holes to hold the band in place.

3. A universal joint including two members with a pair of oppositely located projections extending from the end of each and so that the projections on the two members may interlock, each of said projections having one side surface flat and the other side surface recessed, plugs fitting between the adjacent surfaces of said projections and in the recess thereof and with a flattened surface bearing against the flattened surface of the projections so as to be slidable thereon, a ball located centrally in the joint for spacing the plugs and projections apart, and means for holding said projections and plugs together.

In witness whereof, I have hereunto affixed my signature in the presence of the witnesses herein named.

LOUIS SCHWITZER.

Witnesses:
G. H. BOINK,
O. M. McLAUGHLIN.